United States Patent
Horikoshi et al.

(10) Patent No.: US 8,097,356 B2
(45) Date of Patent: Jan. 17, 2012

(54) BATTERY PACK

(75) Inventors: Seita Horikoshi, Beijing (CN); Kenshin Yonemochi, Kamakura (JP)

(73) Assignee: Lenovo (Singapore) Pte. Ltd., SIngapore (SG)

( * ) Notice: Subject to any disclaimer, the term of this patent is extended or adjusted under 35 U.S.C. 154(b) by 0 days.

(21) Appl. No.: 12/977,247

(22) Filed: Dec. 23, 2010

(65) Prior Publication Data

US 2011/0091751 A1   Apr. 21, 2011

Related U.S. Application Data

(63) Continuation of application No. 12/043,089, filed on Mar. 5, 2008, now Pat. No. 7,887,941.

(30) Foreign Application Priority Data

Mar. 5, 2007   (JP) .................................. 2007-054314

(51) Int. Cl.
  H01M 2/00   (2006.01)
  H01M 2/10   (2006.01)
  H01M 6/30   (2006.01)
(52) U.S. Cl. ...................................... 429/163; 429/110
(58) Field of Classification Search .................... 429/82, 429/142–148, 151–154, 156–159, 161, 175–177, 429/247, 163, 110; 29/623.1–623.5; 206/703–705; 320/106, 112, 156; 428/221
  See application file for complete search history.

(56) References Cited

U.S. PATENT DOCUMENTS

| | | | |
|---|---|---|---|
| 2,087,170 A | 7/1937 | Stephenson | |
| 5,818,198 A | 10/1998 | Mito et al. | |
| 5,939,865 A * | 8/1999 | McGrath et al. | 320/156 |
| 6,002,583 A | 12/1999 | Shoji et al. | |
| 2005/0058899 A1* | 3/2005 | Rivetta | 429/176 |
| 2007/0259258 A1 | 11/2007 | Buck | |

FOREIGN PATENT DOCUMENTS

| | | |
|---|---|---|
| CN | 1815775 | 8/2006 |
| DE | 3843907 | 7/1990 |
| JP | H07-073907 | 3/1995 |

(Continued)

OTHER PUBLICATIONS

Machine translation of JP 2003-331803 (JPO; Nov. 21, 2003).

*Primary Examiner* — Barbara Gilliam
*Assistant Examiner* — Claire L Roe
(74) *Attorney, Agent, or Firm* — Ference & Associates LLC

(57) ABSTRACT

Provision of an extension-type battery pack which is improved in safety thereof against dropping and impact application. Although a battery pack is susceptible to damage caused by an impact since partial battery cells are located outside the outline of a notebook PC when it is mounted on the notebook PC, the battery pack is provided with a partition wall structure including an air space and a fireproof wall formed of a material which does not melt at a temperature of combustible gas discharged from a gas discharge valve of the respective battery cells. The material of the fireproof wall is preferably mica or the like. The partition wall structure can be provided between an inside battery compartment and an outside battery compartment of the battery pack or can be provided among other battery cells. This prevents fire spreading to other battery cells even if high-temperature combustible gas is discharged from a battery cell damaged by an impact or the like.

18 Claims, 5 Drawing Sheets

FOREIGN PATENT DOCUMENTS

| | | |
|---|---|---|
| JP | H08-098426 | 4/1996 |
| JP | 8-293327 | 5/1996 |
| JP | H11-252814 | 9/1999 |
| JP | 2003-151525 | 5/2003 |
| JP | 2003-331803 | 11/2003 |
| JP | 2004-327206 | 11/2004 |
| JP | 2005-088239 | 4/2005 |
| JP | 2005-340015 | 12/2005 |
| JP | 2006-236605 | 9/2006 |
| JP | 2006-260777 | 9/2006 |

\* cited by examiner

BATTERY PACK

CROSS REFERENCE TO RELATED APPLICATION

This application is a continuation application of U.S. patent application Ser. No. 12/043,089, filed Mar. 5, 2008, now U.S. Pat. No. 7,887,941, which claims priority from Japanese patent application No. 2007-054314, filed Mar. 5, 2007, and which is hereby incorporated by reference as if fully set forth herein. The present application claims priority to U.S. patent application Ser. No. 12/043,089.

FIELD OF THE INVENTION

The present invention generally relates to a technique for improving safety of a battery pack which is mounted to be used in a portable electronic device and, more particularly, to a technique for improving safety of a battery pack against an impact which may be applied from the outside.

BACKGROUND OF THE INVENTION

In recent years, as function and performance of portable electronic devices, such as a notebook computer (hereinafter, referred to as a "notebook PC") and a mobile phone, are improved, power consumption of the portable electronic devices is increasing. Accordingly, the capacity or energy density of a cell of a secondary battery used for the portable electronic device also tends to further increase. With such an electronic device, in order to obtain a voltage suitable for an operation of the portable electronic device and an electric capacity sufficient for supplying power for a long period of time, a battery used for the portable electronic device has often taken the form of a battery pack having a plurality of battery cells accommodated in a housing by connecting the battery cells to one another in combination of series and parallel connections.

Hitherto, a secondary battery using a water-soluble electrolyte, such as a nickel cadmium (Ni—Cd) battery or a nickel hydrogen (NiMH) battery, has been adopted as a battery cell, a lithium ion (Li-ion) battery excellent in the mass energy density (Wh/kg) and the volume energy density (Wh/l) has been recently adopted as a battery cell. In the lithium ion battery, cobalt acid lithium is used for a positive electrode, a carbon material is used for a negative electrode, and an organic electrolyte obtained by dissolving lithium salt in a combustible organic solvent is used as an electrolyte. The organic electrolyte is used because the organic electrolyte has such a characteristic that lithium easily reacts with water. Accordingly, a case or a metal jacket is employed for forming a cell of a lithium ion battery and has a sealed structure.

In the secondary battery using the water-soluble electrolyte, even if cell voltage and temperature increase at a late stage of electric charging thereby resolving the electrolyte and generating oxygen gas, the electrolyte returns to original water due to the oxygen cycle or a catalyst plug. However, an electrolyte of the lithium ion battery does not return to the original state once the electrolyte is resolved. Accordingly, if a charging voltage or a charging current increases up to a predetermined value, or more, or the lithium ion battery is used under a condition of any abnormality to thereby increase the temperature, the electrolyte is resolved and gas is generated. As a result, an increase in the internal pressure occurs. For this reason, a gas discharge valve is provided in the case of a cell of the lithium ion battery in order to prevent explosion.

With regard to the form of a battery pack, there has been provided the form of hard pack in which a battery cell is accommodated in a hard plastic case and the form of soft pack in which a battery cell is packed with a heat-shrinkable tube. In case where a plurality of cells is accommodated, the hard pack is adopted because it is easy to handle the hard pack. In the hard pack in which a plurality of battery cells, each consisting of a lithium ion battery is accommodated, a protection circuit is generally provided, which monitors a charging current, a charging voltage, the temperature of a cell and the like, and cuts off a circuit as required. In a recent battery pack, a so-called intelligent battery system is adopted for realizing such a protection circuit and for accurately measuring the residual capacity, which system per se is comprised of a controller or various kinds of sensors incorporated in the battery pack for measuring and controlling a state of charge and discharge, and for further notifying the system of the state of an electronic device.

In many cases, a battery pack mounted in a notebook PC constitutes a part of a housing of the body of the notebook PC. In addition, in order to increase a space where battery cells are accommodated, a so-called extension-type battery pack having a part of a housing protruding from a housing of the notebook PC is adopted. On one hand, when a user uses a notebook PC inside a company, it is common to carry the notebook PC between a conference room and each office without putting the notebook PC in a case or a bag. Accordingly, the likelihood is that the notebook PC might be accidentally dropped onto the floor. At this time, a strong impact to which the weight of the notebook PC is added is loaded on a battery pack, which may eventually cause short-circuiting or breakage of an internal circuit of a battery cell. As a result, the temperature of the cell comes to rise rapidly, and thus high-temperature combustible gas might be discharged from a gas discharge valve to the inside of the battery pack.

When the battery cell is exposed to high-temperature combustible gas for a predetermined time or more, the internal temperature goes up. As a result, the combustible gas is emitted from the gas discharge valve. The high-temperature combustible gas that has been emitted may catch fire due to an electrical circuit inside the battery pack or may cause spontaneous combustion due to high temperature. Since a plurality of battery cells is densely accommodated in a battery pack, there is also a risk such that another battery cell or other battery cells will be heated by the high-temperature combustible gas and combustible gas will be discharged from the heated battery cells, and the temperature inside the housing will be extremely increased, and as a result, all battery cells accommodated in the battery pack will be burnt down by a spreading fire. In addition, the amount of heat energy of the discharged gas increases as the battery cells are closer to a fully charged state, which increases a risk of fire spreading.

Japanese Unexamined Patent Publication (Kokai) No. 8-293327 teaches a battery pack capable of preventing occurrence of fire breakout which might be caused by an evaporated gas of an electrolyte containing an combustible organic solvent by providing a partition wall between a battery compartment which contains battery cells, and an electrical circuit compartment which contains an electrical circuit.

Japanese Unexamined Patent Publication (Kokai) No. 2003-331803 teaches a technique of separating batteries from one another in a battery pack, which contains a plurality of batteries, in order to suppress transmission of heat to a neighboring battery when heat is generated in a certain battery. The same document also teaches a double structure in which a partition wall is formed of a synthetic resin and a space is interposed for defining a duplicated structure to thereby improve a heat insulating effect.

Japanese Unexamined Patent Publication (Kokai) No. 2003-151525 teaches a battery charging and discharging device in which a plurality of batteries are accommodated in a manner such that the batteries are separated from one another by respective separating plates. The separating plates are formed by using fire-resistant polycarbonate, fire-resistant PET, or ABS resin, for example.

An influence of heat generation among battery cells has been suppressed by using a partition wall formed of a fire-resistant synthetic resin or by providing a space inside, as described in the foregoing related art. However, in recent years, as the energy density of a battery cell increases and the number of battery cells integrally packaged in a battery pack increases, it cannot be said that the fire-resistant partition wall described in the related art above is sufficient for suppressing the influence of heat generation among battery cells. For example, in a lithium ion battery used in a notebook PC, there is a case where approximately 1 through 2 liters of combustible gas having a temperature of about 600° C. through 700° C. is discharged from each battery cell. The partition wall formed of the fire-resistant synthetic resin cannot withstand a rise in the temperature caused by high-temperature combustible gas discharged from a battery cell but melts away within a short time. This may cause gas to be discharged from the neighboring battery cells, and as a result, there is such a likelihood that all battery cells might be burnt down. Particularly, in the case of an extension-type battery pack, it is requested to further improve safety because a large mechanical impact may be provided on a battery cell when, for example, the battery pack is dropped. Accordingly, in addition to a protection circuit of a conventionally existing intelligent battery, a novel system capable of fully securing the safety against an impact of a battery pack is required.

Therefore, a need exists to provide a battery pack improved in safety thereof. Further, a need exists to provide a battery pack which is improved in safety thereof against drop and/or impact. Furthermore, a need exists to provide a portable electronic device, which is able to mount therein such a battery pack.

BRIEF SUMMARY

In summary, one aspect of the present invention provides an apparatus comprising: a plurality of battery cells, wherein one or more of the plurality of battery cells is provided with a gas discharge valve; a housing containing the plurality of battery cells, the housing constituting a part of an outline of a body of an electronic device when the battery pack is mounted in the electronic device; a partition wall structure arranged among the battery cells, the partition wall structure having an impact absorbing section which reduces an impact on the battery cells; and a fireproof wall comprising a material that does not melt at a temperature of gas discharged from a gas discharge valve.

Another aspect of the invention provides a method comprising: providing a plurality of battery cells, wherein one or more of the plurality of battery cells is provided with a gas discharge valve; containing the plurality of battery cells within a housing which constitutes a part of an outline of a body of an electronic device when the plurality of battery cells are mounted in the electronic device; arranging a partition wall structure among the battery cells, the partition wall structure having an impact absorbing section which reduces an impact on the battery cells; and providing a fireproof wall comprising a material that does not melt at a temperature of gas discharged from a gas discharge valve.

A still further aspect of the invention provides an apparatus comprising: a plurality of battery cells, wherein one or more of the plurality of battery cells is provided with a gas discharge valve; a housing containing the plurality of battery cells, the housing constituting a part of an outline of a body of an electronic device when the battery pack is mounted in the electronic device; a partition wall structure comprising a plurality of partition walls, the partition wall structure being arranged among the battery cells, the partition wall structure having an impact absorbing section which reduces an impact on the battery cells; and a fireproof wall comprising a flexible material that does not melt at a temperature of gas discharged from a gas discharge valve; wherein the impact absorbing section comprises: a first holding wall located adjacent to a first side of the fireproof wall, the first holding wall extending along a majority of a length of the fireproof wall; a second holding wall and a fixed wall located adjacent to a second side of the fireproof wall; wherein the first holding wall, the second holding wall, and the fixed wall form a cantilever extending from an inner wall of the housing.

For a better understanding of the present invention, together with other and further features and advantages thereof, reference is made to the following description, taken in conjunction with the accompanying drawings, and the scope of the invention that will be pointed out in the appended claims.

DETAILED DESCRIPTION

Figure 1A:
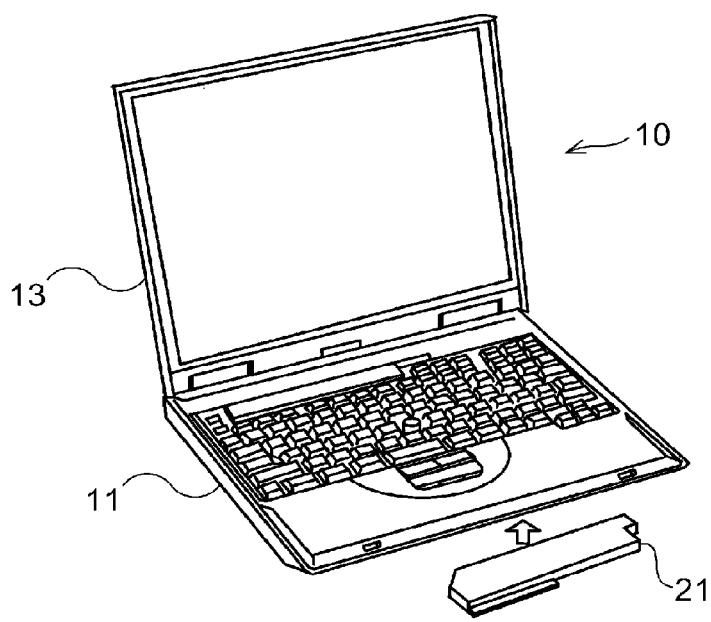
FIG. 1A is a view schematically illustrating the configuration of a notebook PC and a battery pack according to an embodiment of the present invention.

The disclosure will now provide a general overview of the invention followed by a more detailed description of the invention with reference to the figures. It is to be understood that the present invention, in accordance with at least one presently preferred embodiment, as generally described and illustrated in the Figures herein, may be arranged and designed in a wide variety of different configurations. Thus, the following more detailed description of the embodiments of the methods of the present invention, as represented in the Figures, is not intended to limit the scope of the invention, as claimed, but is merely representative of selected embodiments of the invention. Although illustrative embodiments of the present invention have been described herein with reference to the accompanying Figures, it is to be understood that the invention is not limited to those precise embodiments, and that various other changes and modifications may be affected therein by one skilled in the art without departing from the scope or spirit of the invention.

In accordance with one embodiment of the present invention, there is provided a so-called extension-type battery pack having a housing which includes an inside battery compartment, which is located inside an outline of a body of a portable electronic device when the battery pack is mounted in the portable electronic device, and an outside battery compartment which is located outside the outline. Since the outside battery compartment constituted by the housing of the battery pack is located outside the outline of the portable electronic device, battery cells accommodated in the outside battery compartment easily receive a large impact when the battery pack drops in a state where the battery pack is mounted in the portable electronic device. The battery cell is configured such that gas is discharged from a gas discharge valve in order to prevent explosion of a case when the internal temperature rises because of being subjected to any impact which causes generation of high-temperature combustible gas thereby bring about an increase in a pressure. A partition wall structure is provided between the inside battery compartment and the outside battery compartment. The partition wall structure includes a heat-insulating layer and a fireproof wall formed of a material which does not melt at the temperature of discharged gas. Accordingly, since the heat insulating layer may be maintained by the fireproof wall until the temperature of a gas discharged by an impact from a battery cell accommodated in the outside battery compartment decreases, heating and fire spreading to battery cells in the inside battery compartment can be prevented.

In a case where the outside battery compartment accommodates therein a plurality of battery cells, fire spreading among the battery cells held in the outside battery compartment can be prevented by also forming a partition wall structure among the battery cells accommodated in the outside battery compartment. At this stage, the fireproof wall is provided by preferably using an inorganic fire-resistant material having a melting point of 800° C. or more, for example, mica or ceramics. Mica is specifically suitable for the partition wall structure since mica has a low thermal conductivity and a heat insulating effect.

If the partition wall structure is configured to include a first partition wall which extends from an inner wall of the housing toward the other opposite inner wall and fixedly holds the battery cells and the fireproof wall is arranged close to the outside battery compartment such that a space is interposed between the fireproof wall and the first partition wall, the space can function as a heat insulating layer. Accordingly, it is possible to suppress transmission of temperature, which is caused by gas generated at the outside battery compartment side, to the inside battery compartment side. In addition, since the fireproof wall is provided at the outside battery compartment side, the first partition wall can be protected against heat until the temperature of the outside battery compartment decreases, and accordingly, the space serving as a heat insulating layer can be maintained. Moreover, since the first partition wall also has a function of fixing a battery cell, a space required for forming a heat insulating layer in a housing can be saved.

If the fireproof wall is located adjacent to a second partition wall which extends from an inner wall of the housing to the middle, toward the other opposite inner wall and holds the fireproof wall, the second partition wall and the fireproof wall displace the space serving as a heat insulating layer toward the inside battery compartment to thereby absorb an impact when a battery cell contained in the outside battery compartment receives the impact. In addition, since the second partition wall is displaced in a structure of a cantilever, the second partition wall can be restored when an impact is blown over. Accordingly, the effect described above can also be maintained for a next impact. In the battery pack according to the present invention, even if the housing is formed of a fire-resistant synthetic resin, fire spreading from a battery cell of the outside battery compartment to a battery cell of the inside battery compartment does not occur when an impact occurs because the partition wall structure includes the fireproof wall and the heat insulating layer.

In accordance with an embodiment of the present invention, a housing of a battery pack constitutes a part of the outline of the body of a portable electronic device when the battery pack is attached to the portable electronic device. In addition, a partition wall structure which includes a fireproof wall and a heat-insulating layer arranged among battery cells is provided. By this configuration, even if any battery cell fires because of an impact applied to the housing by drop of an electronic device or collision with an external matter, heating and fire spreading to the other battery cells partitioned by the partition wall structure can be prevented. In a case where a battery pack includes an electrical circuit compartment which contains a processor and a switching circuit, introduction of combustible gas into the electrical circuit compartment, which might easily become a firing source, can be prevented by forming the partition wall structure between battery cells and the electrical circuit compartment.

In accordance with an embodiment of the present invention, a housing of a battery pack constitutes a part of an outline of a body of a portable electronic device when the battery pack is mounted in the portable electronic device. In addition, the partition wall structure is arranged among battery cells and includes an impact absorbing section which reduces an impact on the battery cells and a fireproof wall which does not melt at a temperature of gas, which is discharged from the gas discharge valve. By this configuration, the battery cells are not easily damaged or broken even if an impact is added to the housing. In addition, even if the battery cells are damaged and gas is discharged from the gas discharge valve, an influence of heat to another battery cell or cells can be reduced to thereby prevent fire spreading.

In accordance with the present invention, it is possible to provide a battery pack which is improved in safety thereof. Furthermore, in the present invention, it is possible to provide a battery pack which is improved in its safety against drop or application of impact. Furthermore, in the present invention, it is possible to provide a portable electronic device which is able to mount therein such a battery pack.

Figure 1B:
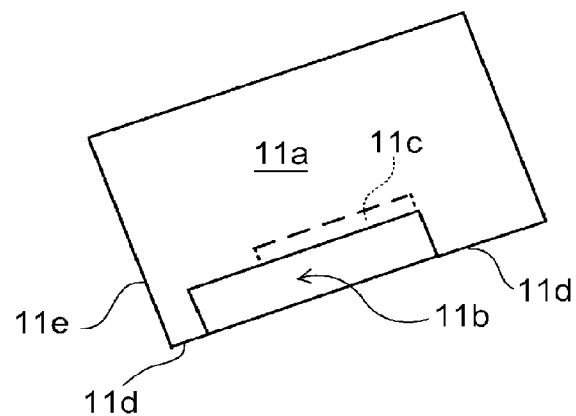
FIG. 1B is a view schematically illustrating the configuration of a notebook PC and a battery pack according to an embodiment of the present invention.
Figure 1C:
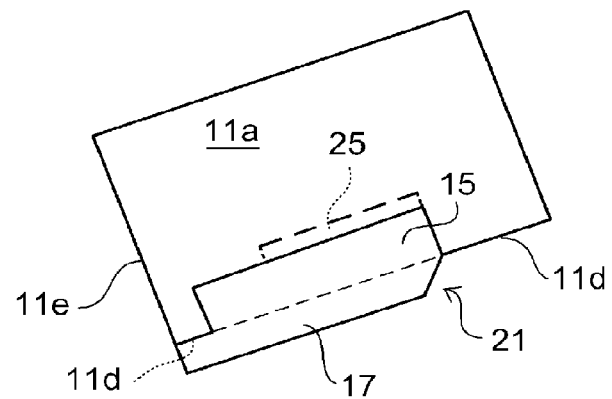
FIG. 1C is a view schematically illustrating the configuration of a notebook PC and a battery pack according to an embodiment of the present invention.

Referring now to the Figures, FIGS. 1A through 1C are views schematically illustrating the configuration of a notebook PC 10 according to an embodiment of the present invention. FIG. 1A is a perspective view illustrating the outer appearance of the notebook PC 10 when a cover of the notebook PC 10 is opened so that a user uses the notebook PC 10. The notebook PC 10 is configured to include a main housing 11, which has a surface on which a keyboard and a pointing device are mounted and in which many kinds of devices are contained, and a display-side housing 13 having a surface on which a liquid crystal display (LCD) is mounted. The display-side housing 13 is openably and closably attached to the main housing 11. In addition, a battery pack 21 is removably mounted on a rear side of a bottom surface of the main housing 11.

FIG. 1B is a plan view illustrating a bottom surface of the notebook PC 10 when the battery pack 21 is removed from the notebook PC. A battery bay 11*b* for mounting therein the battery pack 21 is formed in the bottom surface of the notebook PC 10. A terminal for the battery pack 21 is formed at a part of the battery bay 11*b*, and the part serves as a region 11*c* where an electrical circuit compartment 25 (also refer to FIG. 2) of the battery pack 21 is provided. Here, the outline of the body of the notebook PC 10 will be described. When a battery pack is removed from the notebook PC 10, the battery bay 11*b* becomes vacant. A bottom surface 11*a* and a side surface 11*d* which constitute a main housing of the notebook PC 10 are present around the battery bay 11*b*. In addition, a surface formed by crossing of the bottom surface 11*a* and the side surface 11*d* when the bottom surface 11*a* and the side surface 11*d* extend constitutes a portion of the outline of the body of the notebook PC 10. In addition, the outline of the body of the notebook PC 10 is most of the surface of the body of the notebook PC. In a state where a cover of the notebook PC 10 is closed, the outline of the body of the notebook PC 10 is formed by the main housing 11 and the display-side housing 13 and has an approximately rectangular parallelepiped shape.

FIG. 1C is a plan view illustrating the bottom surface of the notebook PC 10 when the battery pack 21 is mounted in the battery bay 11*b*. When the battery pack 21 is housed in the battery bay 11*b*, a part of a surface of a housing of the battery pack 21 exists on a plane including the bottom surface 11*a* of the main housing. The battery pack 21 according to the present embodiment is of a so-called extension type, and a part of a portion in which a battery is contained protrudes outward beyond the side surface 11*d* that is the outline of the body of the notebook PC 10. The extension-type battery pack 21 has been contrived so as to extend only a space for accommodating therein a battery cell without increasing the size of the body of the notebook PC 10.

The housing of the battery pack 21 is configured to include an outside battery compartment 17 which accommodates a part of battery cells, an inside battery compartment 15 which accommodates the remainder of the battery cells, and an electrical circuit compartment 25, as will be described later with reference to FIG. 2. An outer surface of the housing of the inside battery compartment 15 lies in the same plane as the bottom surface 11*a* of the main housing 11 and constitutes a part of the outline of the body of the notebook PC 10. The part of the housing which forms the outside battery compartment 17 is arranged on an outside of the side surface 11*d* which constitutes the outline of the body of the notebook PC 10. When the outside battery compartment 17 of the notebook PC 10 dropped from a user's hand first collides with the ground, an impact to which the weight of the notebook PC 10 is directly added will hit the outside battery compartment 17 and a battery cell accommodated inside the outside battery compartment 17 are damaged or broken.

In addition, since a part of the housing which forms the inside battery compartment 15 is exposed to the outside on the same plane as the bottom surface 11*a* of the main housing 11, a battery cell mounted in the inside battery compartment 15 may also be damaged due to an impact if there is any projection on the ground. If a battery cell is damaged due to the impact, there is a case where an internal circuit is short-circuited to become overheated, and as a result, high-temperature gas is eventually discharged from a gas discharge valve. The amount of gas increases depending on the charging amount of battery cell when an impact is applied, which further increases the internal temperature of the battery pack 21.

Figure 2:
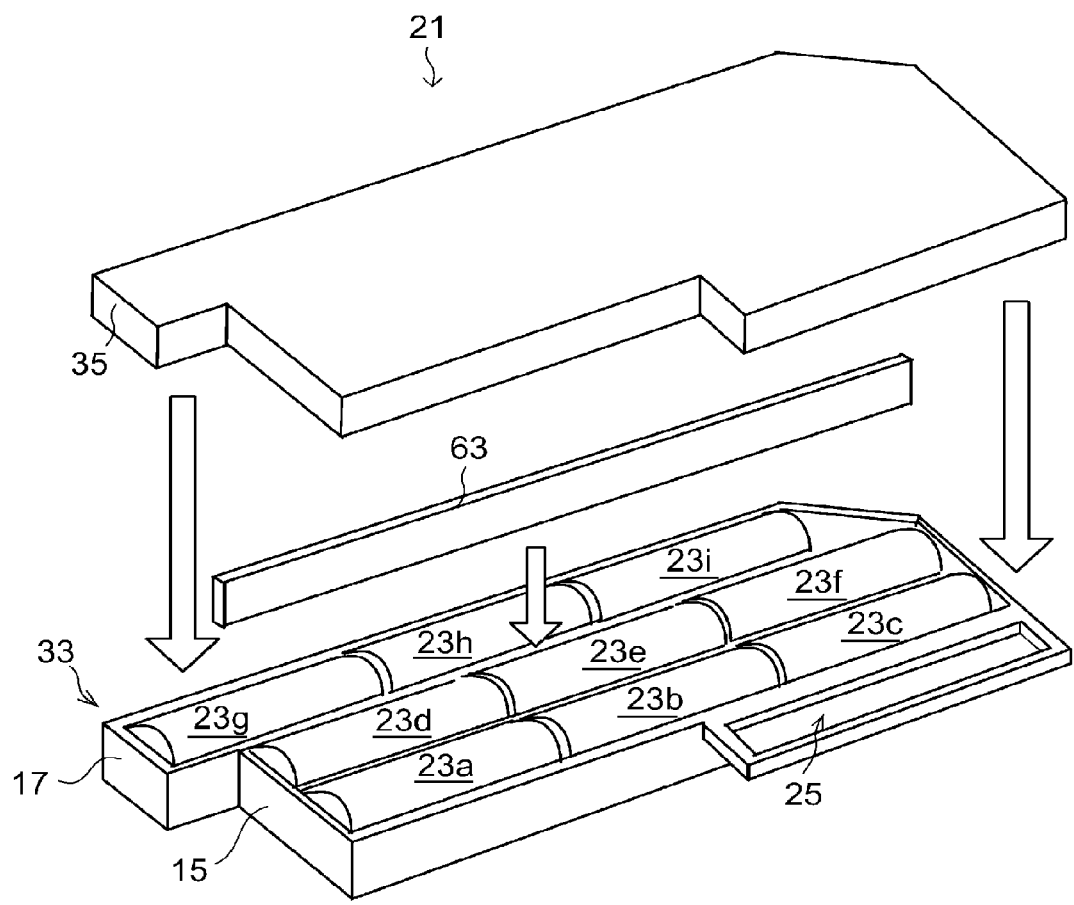
FIG. 2 is a perspective view illustrating the configuration of the battery pack according to the embodiment of the present invention.

FIG. 2 is a perspective view illustrating the configuration of the battery pack 21. An outer package of the battery pack 21 is configured to include an upper housing 33 and a lower housing 35 each of which is formed of material comprised of a fire-resistant synthetic resin, such as an ABS resin and a polycarbonate resin. The upper housing 33 and the lower housing 35 are combined so as to be easily opened by a normal user. The upper housing 33 is configured to include the outside battery compartment 17, the inside battery compartment 15, and the electrical circuit compartment 25.

Nine cylindrical battery cells 23*a* through 23*i*, which are lithium ion batteries, are contained in the upper housing 33. Three battery cells 23*g* through 23*i* connected in series are contained in the outside battery compartment 17, and three battery cells 23*d* through 23*f* connected in series and battery cells 23*a* through 23*c* connected in series are mounted in the inside battery compartment 15. In addition, the three battery cells 23*g* through 23*i* connected in series, the three battery cells 23*d* through 23*f* connected in series, and the three battery cells 23*a* through 23*c* connected in series are connected in parallel. A circuit board (not shown) on which is mounted a control circuit including a micro processor, a switch, a temperature sensor and the like, which conduct measurement and control of the state of charge and discharge, is housed in the electrical circuit compartment 25, in such a manner that the battery pack 21 is constituted as an intelligent battery. In addition, a power supply terminal and a signal terminal connected to the notebook PC 10 are formed in the electrical circuit compartment 25. Between the outside battery compartment 17 and the inside battery compartment 15, a mica plate 63 serving as a fireproof wall is provided.

Figure 3:
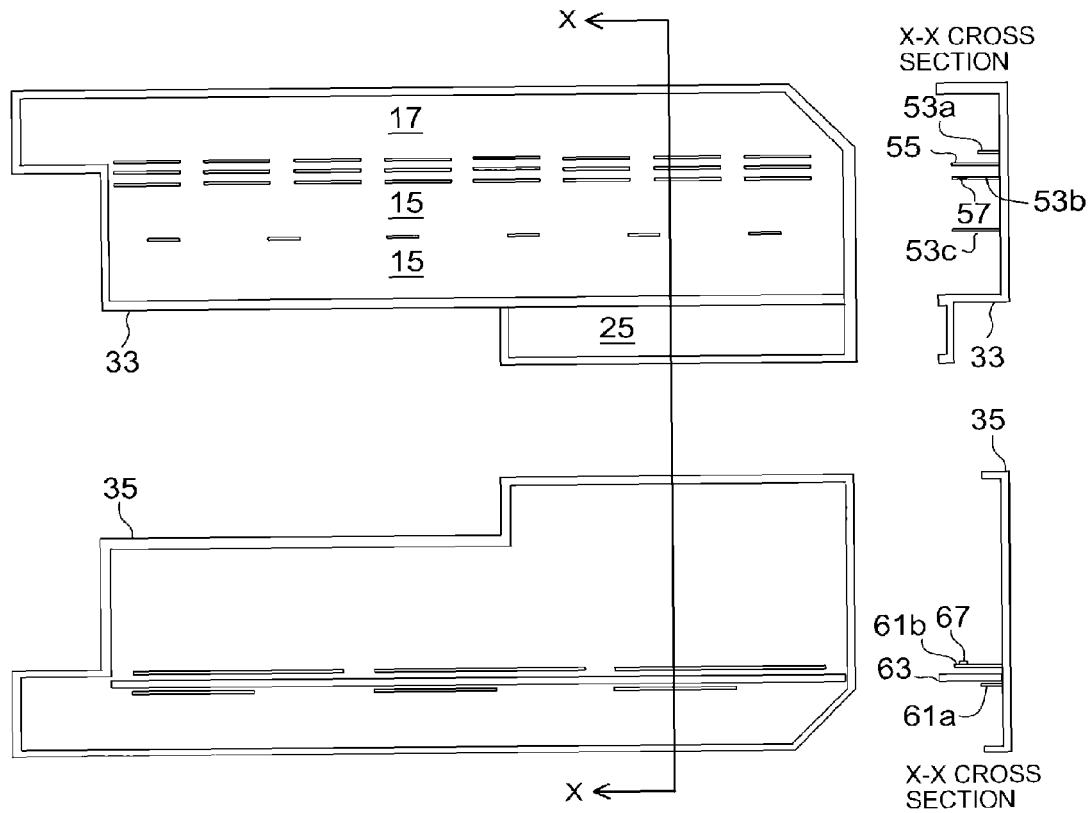
FIG. 3 is a plan view illustrating the configuration of a housing of the battery pack according to the embodiment of the present invention.
Figure 4:
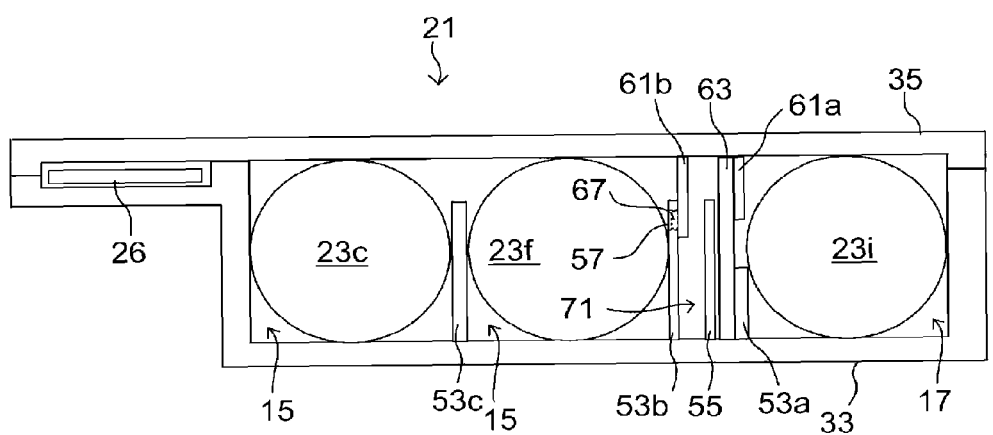
FIG. 4 is a cross-sectional view illustrating the configuration of a partition structure according to the embodiment of the present invention.

FIG. 3 is a plan view illustrating the configuration of the upper housing 33 and the lower housing 35 of the above-mentioned battery pack, and FIG. 4 is a side view illustrating a cross section taken along the line X-X of FIG. 3 in a state in which the upper housing 33 and the lower housing 35 shown in FIG. 3 are assembled. The upper housing 33 and the lower housing 35 are formed of a fire-resistant synthetic resin, such as an ABS resin or polycarbonate. FIG. 3 includes two cross-sectional views which illustrate inner plane surfaces of the upper housing 33 and the lower housing 35 and side surfaces when viewed from a cross section taken along the line X-X, respectively. From an inner surface of the upper housing 33, a fixed wall 53*a* which is fixed with the battery cells 23*g* through 23*i* accommodated in the outside battery compartment 17 interposed between the inner surface and the fixed wall 53*a* and fixed walls 53*b* and 53*c* which are fixed with the battery cells 23*d* through 23*f* and the battery cells 23*a* through 23*c* accommodated in the inside battery compartment 15 interposed between the inner surface and the fixed walls 53*b* and 53*c*, respectively, are formed so as to extend to the middle toward an inner surface of the lower housing 35 in an assembled state.

Eight pieces of fixed walls 53*a* and eight pieces of fixed walls 53*b* are formed in the longitudinal direction of the battery pack. Six pieces of fixed walls 53*c* are formed in the longitudinal direction of the battery pack. In addition, from the inner surface of the upper housing 33, a holding wall 55 is formed so as to extend to the middle toward the inner surface of the lower housing 35 in the assembled state. The holding wall 55 holds the fireproof wall 63 formed by using the mica plate. The fixed walls 53a though 53c and the holding wall 55 are integrally formed as the upper housing 33 by using die-casting. A fitting hole 57 is formed in the fixed wall 53b.

From the inner surface of the lower housing 35, holding walls 61a and 61b which extend to the middle toward the inner surface of the upper housing 33 in the assembled state are formed. The holding walls 61a and 61b are integrally formed as the lower housing 35 by using the die-casting. In the assembled state, the holding wall 61a corresponds to the position of the fixed wall 53a, and the holding wall 61b corresponds to the position of the fixed wall 53b. The holding wall 61b is formed with an engagement protrusion 67. The engagement protrusion 67 fits in the fitting hole 57 in the assembled state, thereby combining the upper housing 33 with the lower housing 35. The mica plate 63 is mounted in a space formed by the holding walls 55 and 61a and the fixed wall 53a. The mica plate 63 is formed using one member such that the inside battery compartment 15 and the outside battery compartment 17 are continuously separated from each other in the longitudinal direction. However, in the present invention, it may be possible to adopt a structure in which a plurality of mica plates are used and some spaces are provided among the mica plates, for example, three mica plates corresponding to the length of battery cells are provided.

The circuit board 26 is housed in the electrical circuit compartment 25. When the battery cells 23a through 23i and the circuit board 26 are mounted in the upper housing 33 and the upper housing 33 and the lower housing 35 are made to fit to each other by positioning the mica plate 63 between a surface, which is formed by the fixed wall 53a and the holding wall 61a, and the holding walls 55, the battery pack 21 is assembled. At this time, the engagement protrusion 67 of the holding wall 61b fits in the fitting hole 57 of the fixed wall 53b so that the holding wall 61b and the fixed wall 53b are combined together, thereby forming a partition wall on the inside battery compartment side. In addition, an air layer 71 having a thickness of about 1 through 2 mm is formed between the mica plate 63 and the partition wall on the inside battery compartment 15 side. The air layer 71 functions as a heat-insulating layer against gas discharged from a battery cell.

The mica, which is a material of the mica plate 63, is a natural ore and is excellent in electric insulation, thermal resistance, heat insulation, flexibility, and the like. Particularly for the thermal resistance, the mica has a property that a melting point thereof is 1250° C. Here, mica which is soft mica having flexibility and has a plate shape having a thickness of approximately 0.8 mm is used.

If the notebook PC 10 to which the battery pack 21 having the above-described configuration drops down onto the floor to thereby receive a strong impact on a first containing portion 51a, the battery cell 23i mounted in the outside battery compartment 17 will be damaged. Then, the temperature of the battery cell 23i rises rapidly to thereby generate gas inside. Then, the pressure rises, such that high-temperature gas is discharged from a gas discharge valve. The amount of gas discharged per battery cell is approximately 1 through 2 liters, and the temperature at the time of gas discharge is about 600 to 700° C. Since a lithium ion battery cell generally conforms to the UL Standard, the lithium ion battery cell is manufactured so as not to fire and explode even if the lithium ion battery cell is placed at an environmental temperature of 150° C. for 10 minutes. However, for the temperature exceeding 150° C., there is no specific standard or guarantee to be satisfied. Accordingly, in reality, there is a case where the lithium ion battery cell fires or the case explodes depending on the environmental temperature and lasting time exceeding 150° C. and 10 minutes.

Accordingly, if cases of other battery cells are exposed to gas, which is discharged from the battery cell 23i and has a temperature of about 600 to 700° C., the battery cells may also fire or explode. As a result, there is a risk that the entire battery pack 21 will be damaged due to the spreading fire. In addition, materials of a separating plate, which has conventionally served to separate batteries one another within a housing of a battery pack, are fire-resistant polycarbonate, fire-resistant PET, ABS resin, or the like. Even if those materials are fire-resistant materials, the materials melt and fall in a moment when the materials are exposed to gas having a temperature of 600 to 700° C. Accordingly, In this case, the likelihood is that an occurrence of fire spreading might not be prevented.

In order to minimize the damage by preventing the spreading fire generated by gas discharged from the battery cell 23i, it is necessary to cause high-temperature gas not to flow around other battery cells, to decrease the temperature of discharged gas, and to prevent the other battery cells from being affected due to the high temperature of gas. In the present embodiment, fire spreading from the battery cells 23g to 23i accommodated in the outside battery compartment 17 to the battery cells 23a to 23f housed in the inside battery compartment 15 is prevented by using the mica plate 63 and the air layer 71. A method of arranging the mica plate 63 inside the housing is not limited to the example described up to now, but other methods, such as inserting the mica plate 63 by forming a groove on an inner surface of the housing or fixing the mica plate 63 with an adhesive, may be used.

Figure 5A:
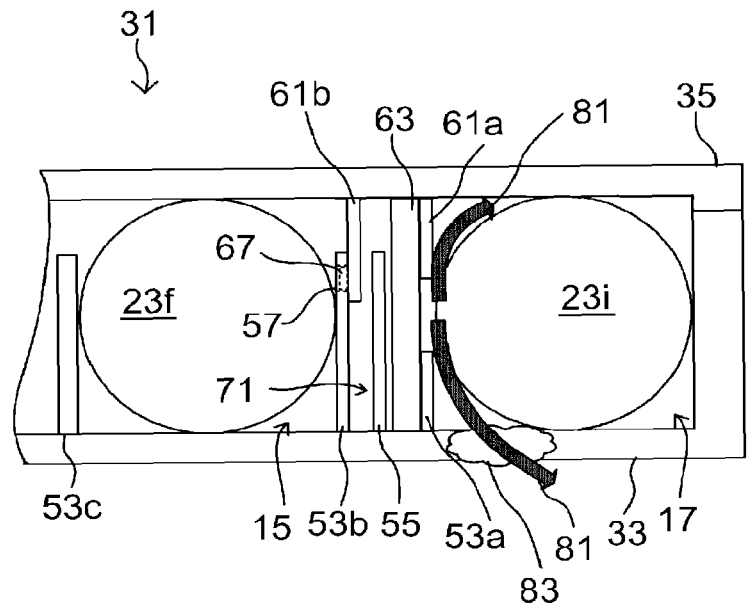
FIG. 5A is a cross-sectional view illustrating the behavior inside a battery pack when gas is discharged from a battery cell.
Figure 5B:
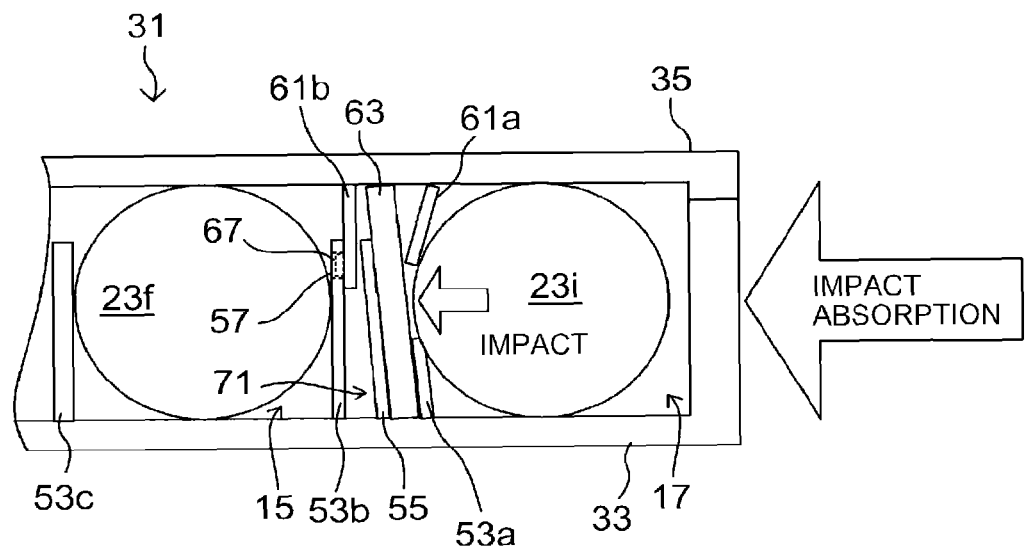
FIG. 5B is a cross-sectional view illustrating the behavior inside a battery pack when gas is discharged from a battery cell.

FIGS. 5A and 5B are views illustrating the behavior inside the battery pack 21 in the case when gas 81 is discharged from the battery cell 23i and in the case where a strong impact is applied to the outside battery compartment 17 from the outside. FIGS. 5A and 5B show a part of the same cross section as FIG. 4. FIG. 5A shows a case in which the gas 81 has been discharged from the battery cell 23i. The gas 81 discharged from the battery cell 23i stays inside the outside battery compartment 17 and melts the inner wall of the outside battery compartment 17, the fixed wall 53a, and the holding wall 61a. A part of gas heats the mica plate 63, but the mica plate 63 does not break and fall at the gas temperature of 600 to 700° C.

Therefore, since the discharged gas 81 is blocked by the mica plate 63, the discharged gas 81 does not reach the inside battery compartment 15. In the case where the amount of gas is small even if a part of gas reaches the inside battery compartment 15, any dangerous situation such as the fire spreading does not occur because the temperature rapidly falls. Although the fixed wall 53a and the holding wall 61a melt in a moment, the holding wall 55 can keep an original form for a comparatively long period of time since the mica plate 63 has a high heat insulating property. In addition, since the pressure in the outside battery compartment 17 is higher than that in the inside battery compartment 15, the mica plate 63 is pressed against the inside battery compartment side. Accordingly, gas can be blocked for a while.

Since the air layer 71 is maintained while the mica plate 63 is blocking the gas, a rise in temperature of the inside battery compartment 15 is suppressed. Since the upper housing 33 and the lower housing 35 are formed by using a fire-resistant synthetic resin, a housing positioned at the outside battery compartment 17 side eventually melts and falls due to the gas 81 having a temperature of 600 to 700° C. As a result, the mica plate 63 may lose a function of blocking the gas 81. However, it is sufficient that the mica plate 63 blocks the gas 81, in order to suppress transmission of heat from the outside battery compartment 17 to the inside battery compartment 15, during a short period of time until the temperature decreases up to a temperature at which the gas 81 is safe.

On the other hand, if there is a partial fusion 83 in a portion of the upper housing 33 or the lower housing 35 corresponding to the outside battery compartment 17, the internal temperature of the outside battery compartment 17 falls rapidly since the gas 81 is discharged outside the battery pack 21 through the partial fusion 83. Accordingly, even if the upper housing 33 and the lower housing 35 are formed by using the fire-resistant synthetic resin, fire spreading to the battery cells 23a to 23f can be prevented.

FIG. 5B is a view illustrating a state in the case when a strong impact is given to the outside battery compartment 17 from the outside. Since the mica plate 63 is formed of soft mica having flexibility, the mica plate 63 per se can act as a buffer material against an impact on the battery cell 23i. Since each of the holding walls 61a and 55 and the fixed wall 53a has a cantilever-like structure which extends from an inner wall of a housing to the middle, front ends of the holding walls 61a and 55 and the fixed wall 53a are displaced toward the inside battery compartment 15 together with the mica plate 63 in order to absorb a strong impact, which cannot be absorbed by the flexibility exhibited by the mica plate 63. Such free displacement of the holding walls 61a and 55 and the fixed wall 53a are realized by the air layer 71. Since each of the holding walls 61a and 55 and the fixed wall 53a is supported in the state of a cantilever, the holding walls 61a and 55 and the fixed wall 53a can be restored depending on the degree of an impact, and accordingly, preparation can also be made to meet a next impact.

Thus, even if a strong impact is given to the outside battery compartment 17, discharge of gas caused by damage of a cell can be prevented since an impact on the battery cells 23g to 23i mounted in the outside battery compartment 17 is reduced. Even if discharge of gas occurs simultaneously with the displacement of the mica plate 63 due to an impact, a gas blocking operation of the mica plate is effective and a heat insulating operation is also effective since the air layer 71 still remains. Accordingly, fire spreading to the battery cells 23a to 23h contained in the inside battery compartment 15 can be prevented.

As described heretobefore, the air layer 71 has two functions including a function of blocking heat transferred from the discharged gas 81 and a function of buffering an impact acting on the battery cell 23i. In order to further improve the two functions, for example, a material, such as urethane foam, having a buffering function and a heat insulating function may be provided instead of the air layer 71 or together with the air layer 17. Although the partition wall structure according to the present embodiment is advantageous in that the partition wall structure can be applied to a battery pack formed of a fire-resistant synthetic resin that is generally adopted in recent years, the upper housing 33 and the lower housing 35 may be formed by using a light metal-based material, such as a magnesium-based material and an aluminum-based material, such that the upper housing 33 and the lower housing 35 do not easily fall by the gas 81.

Although the battery pack 21 has been configured to prevent fire spreading from the battery cells 23g to 23i contained in the outside battery compartment 17 to the battery cells 23a to 23f contained in the inside battery compartment 15, the present invention may be configured to prevent fire spreading among battery cells contained in the inside battery compartment 15 and fire spreading among battery cells mounted in the outside battery compartment 17. As described above, if a part of the lower housing 35 defines the outline of the main housing 11, there is a possibility that the battery cells 23a to 23f accommodated in the inside battery compartment 15 will receive an impact from the outside of the main housing 11. Furthermore, even if there is no impact from the outside, the temperature of any of the battery cells 23a to 23i may abnormally increase to cause firing or explosion in the case when a voltage between battery cells connected in parallel becomes unbalanced to thereby cause an excessive current to flow among the cells or in case where the battery cells deteriorate to be short-circuited. Therefore, in order to reduce such danger in the above cases, it is also desirable to provide a structure capable of preventing the fire spreading among battery cells.

Figure 6:
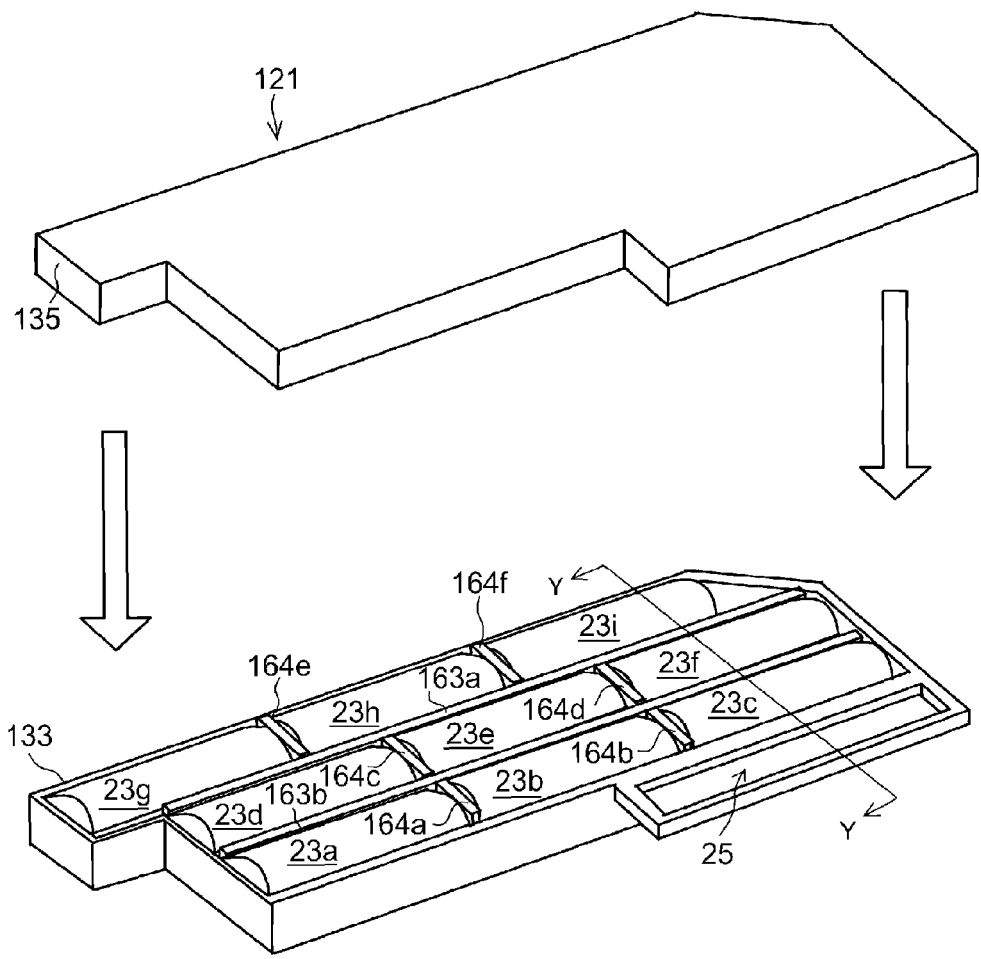
FIG. 6 is a perspective view illustrating the configuration of a battery pack according to the embodiment of the present invention.

FIG. 6 is a view schematically illustrating the configuration of a battery pack 121 in an example of solving such danger. The battery pack 121 is applied to the same notebook PC 10 as that shown in FIGS. 1A to 1C. In addition, the same elements of the battery pack 121 as those of the battery pack 21 are denote by the same reference numerals, and a detailed description thereof will be omitted for the simplicity sake. In an upper housing 133 and a lower housing 135 of the battery pack 121, not only a partition wall structure 163a is formed between an outside battery compartment and an inside battery compartment but also a partition wall structure 163b is formed between battery cells 23a to 23c and battery cells 23d to 23f mounted in the inside battery compartment. Since the electrical circuit compartment 25 contains therein a circuit board that easily serves as a firing source, the safety is further improved by also providing the partition wall structure between the electrical circuit compartment 25 and a battery cell.

Figure 7:
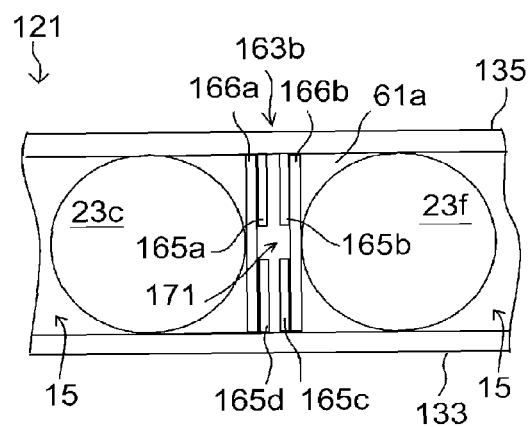
FIG. 7 is a cross-sectional view illustrating the configuration of a partition structure according to the embodiment of the present invention.

Furthermore, partition wall structures 164a to 164f are also provided among battery cells connected in series. The basic structures of the partition wall structures 163a, 163b, and 164a to 164f are basically equal in that each of the partition wall structures 163a, 163b, and 164a to 164f is configured to include the mica plate and the air layer shown in FIG. 4. FIG. 7 is a partial side view illustrating the cross section taken along the line VII-VII of FIG. 6. FIG. 7 shows details of the partition wall structure 163b formed among the battery cells 23c and 23f mounted in the inside battery compartment 15. The partition wall structure 163b is configured to include mica plates 166a and 166b, holding walls 165a to 165d, and an air layer 171. The holding walls 165a and 165b extend from an inner surface of the lower housing 135 to the middle toward an inner surface of the upper housing 133.

The holding walls 165c and 165d extend from the inner surface of the upper housing 133 to the middle toward the inner surface of the lower housing 135. The mica plate 166a is positioned to be interposed between the battery cell 23c and the holding walls 165a and 165d, the mica plate 166b is positioned to be interposed between the holding walls 165b and 165c and the battery cell 23f. In addition, a space of the air layer 171 is formed between the mica plates 166a and 166b.

In the partition wall structure 163b shown in FIG. 7, the mica plate 166b blocks gas from the battery cell 23c when the gas is discharged from the battery cell 23f, and the mica plate 166a blocks gas from the battery cell 23f when the gas is discharged from the battery cell 23c. The air layer 171 shows a heat insulating effect even if gas is discharged from any battery cell. In addition, since the holding walls 165a to 165d extend from the inner surface of the upper housing 133 or the lower housing 135 in the state of a cantilever, the holding walls 165a to 165d absorb an impact on the battery cell in the same mechanism as described in FIG. 5B.

The battery pack having the structure described above may be adopted for not only the notebook PC but also other portable electronic devices in which the battery pack is mounted such that a surface of a battery cell becomes a part of a surface of a housing the body. Types of battery cells used in a battery pack are not limited to the lithium ion battery, but the present invention is effective for battery packs in which other types of battery cells, from which high-temperature combustible gas may be discharged when damaged, are used. A material of the fireproof wall is not limited to mica, but materials capable of maintaining a blocking function until the temperature of gas discharged from a battery cell falls can be adopted as materials of the fireproof wall.

While the present invention has been described with reference to the specific embodiment shown in the drawings, it is needless to say that the present invention is not limited to the embodiment described in the drawings but known configurations may also be adopted as long as the effects of the present invention are obtained.

The present invention can be applied to a battery pack that constitutes a part of the outline of the portable electronic device.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An apparatus comprising:
    a plurality of battery cells, wherein one or more of the plurality of battery cells is provided with a gas discharge valve;
    a housing containing the plurality of battery cells, the housing constituting a part of an outline of a body of an electronic device when a battery pack is mounted in the electronic device;
    a partition wall structure arranged among the battery cells, the partition wall structure having an impact absorbing section which reduces an impact on the battery cells; and
    a fireproof wall comprising a material having a melting point equal to or greater than 800° C., such that the fireproof wall does not melt at a temperature of gas discharged from the gas discharge valve.

2. The apparatus according to claim 1, wherein the partition wall structure comprises a plurality of partition walls.

3. The apparatus according to claim 2, wherein the fireproof wall is disposed between the plurality of partition walls.

4. The apparatus according to claim 2, wherein the plurality of partition walls comprises:
    a first partition wall extending from one inner wall of the housing toward another inner wall to fix a first battery cell disposed adjacent to the first partition wall; and
    a second partition wall fixing a second battery cell disposed adjacent to the second partition wall,
    wherein the fireproof wall comprises:
        a first fireproof wall arranged between a first battery cell and the first partition wall; and
        a second fireproof wall arranged between a second battery cell and the second partition wall.

5. The apparatus according to claim 1, further comprising a heat insulating layer.

6. The apparatus according to claim 5, wherein the heat insulating layer is selected from the group consisting of: urethane foam and an air layer arranged adjacent to the fireproof wall.

7. The apparatus according to claim 1, further comprising:
    an electrical circuit compartment wherein a processor and a switch circuit are accommodated, wherein the partition wall structure is provided between the battery cells and the electrical circuit compartment.

8. The apparatus according to claim 1, wherein the fireproof wall is formed of mica.

9. The apparatus according to claim 8, wherein the fireproof wall formed of mica is arranged within the housing by forming a groove on an inner surface of the housing.

10. A method comprising:
    providing a plurality of battery cells, wherein one or more of the plurality of battery cells is provided with a gas discharge valve;
    containing the plurality of battery cells within a housing, the housing constituting a part of an outline of a body of an electronic device when the plurality of battery cells are mounted in the electronic device;
    arranging a partition wall structure among the battery cells, the partition wall structure having an impact absorbing section which reduces an impact on the battery cells; and
    providing a fireproof wall comprising a material having a melting point equal to or greater than 800° C., such that the fireproof wall does not melt at a temperature of gas discharged from the gas discharge valve.

11. The method according to claim 10, wherein the partition wall structure comprises a plurality of partition walls.

12. The method according to claim 11, wherein the fireproof wall is disposed between the plurality of partition walls.

13. The method according to claim 11, wherein the plurality of partition walls comprises:
    a first partition wall extending from one inner wall of the housing toward another inner wall to fix a first battery cell disposed adjacent to the first partition wall; and
    a second partition wall fixing a second battery cell disposed adjacent to the second partition wall,
    wherein the fireproof wall comprises:
        a first fireproof wall arranged between a first battery cell and the first partition wall; and
        a second fireproof wall arranged between a second battery cell and the second partition wall.

14. The method according to claim 10, further comprising a heat insulating layer.

15. The method according to claim 14, wherein the heat insulating layer is selected from the group consisting of: urethane foam and an air layer arranged adjacent to the fireproof wall.

16. The method according to claim 10, further comprising:
    an electrical circuit compartment wherein a processor and a switch circuit are accommodated, wherein the partition wall structure is provided between the battery cells and the electrical circuit compartment.

17. The method according to claim 10, wherein the fireproof wall is formed of mica.

18. An apparatus comprising:
    a plurality of battery cells, wherein one or more of the plurality of battery cells is provided with a gas discharge valve;
    a housing containing the plurality of battery cells, the housing constituting a part of an outline of a body of an electronic device when a battery pack is mounted in the electronic device;
    a partition wall structure comprising a plurality of partition walls, the partition wall structure being arranged among the battery cells, the partition wall structure having an impact absorbing section which reduces an impact on the battery cells; and
    a fireproof wall comprising a flexible material having a melting point equal to or greater than 800° C., such that the fireproof wall does not melt at a temperature of gas discharged from the gas discharge valve;

wherein the impact absorbing section comprises:

a first holding wall located adjacent to a first side of the fireproof wall, the first holding wall extending along a majority of a length of the fireproof wall;

a second holding wall and a fixed wall located adjacent to a second side of the fireproof wall;

wherein the first holding wall, the second holding wall, and the fixed wall form a cantilever extending from an inner wall of the housing.

* * * * *